United States Patent [19]

Silva

[11] Patent Number: 4,606,319
[45] Date of Patent: Aug. 19, 1986

[54] SYSTEM AND METHOD OF VAPORIZING LIQUID FUEL FOR DELIVERY TO AN INTERNAL COMBUSTION ENGINE

[76] Inventor: Robert E. Silva, 6452 N. 8th St., Fresno, Calif. 93710

[21] Appl. No.: 642,057

[22] Filed: Aug. 20, 1984

[51] Int. Cl.$^4$ ................... F02M 31/00; F02M 13/08
[52] U.S. Cl. .................................. 123/525; 123/527; 123/557; 123/576
[58] Field of Search ............. 123/525, 527, 557, 552, 123/276 E, 575, 576, 577, 578

[56] References Cited

U.S. PATENT DOCUMENTS

| | | | |
|---|---|---|---|
| 1,384,512 | 7/1921 | Buchi | 123/578 |
| 2,701,133 | 2/1955 | Mendez | 123/525 |
| 3,718,000 | 2/1973 | Walker | 123/525 |
| 4,227,497 | 10/1980 | Mathieson | 123/525 |
| 4,359,996 | 11/1982 | Kirkland | 123/578 |
| 4,499,885 | 2/1985 | Weissenbach | 123/525 |

Primary Examiner—Ronald H. Lazarus
Attorney, Agent, or Firm—Thorpe, North & Western

[57] ABSTRACT

Apparatus and methods are disclosed for controlled vaporization of a liquid fuel and delivery of the vaporized fuel to an internal combustion engine. Vaporizing apparatus, which uses heat generated by the internal combustion engine vaporizes the liquid fuel, and the vaporized fuel is fed to the carburetor of the engine. Means are provided for automatically supplying a vapor fuel to the carburetor as necessary to operate the engine in the absence of sufficient vaporized liquid fuel. The vapor fuel is also delivered to the engine during high acceleration or when the engine is working under very large loads. Means are also included for controlling the generation of vaporized liquid fuel in proportion to the load on the engine, and for recovering any vaporized liquid fuel and vapor fuel which is not used by the engine.

26 Claims, 6 Drawing Figures

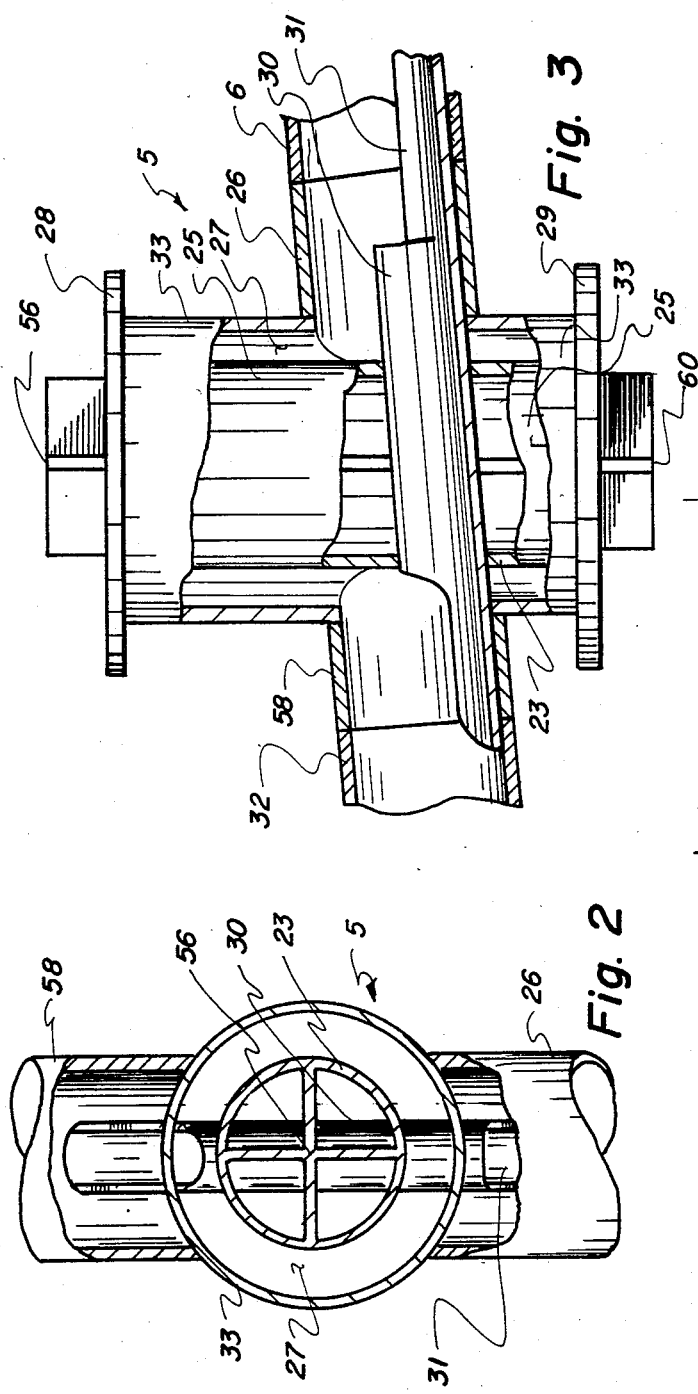
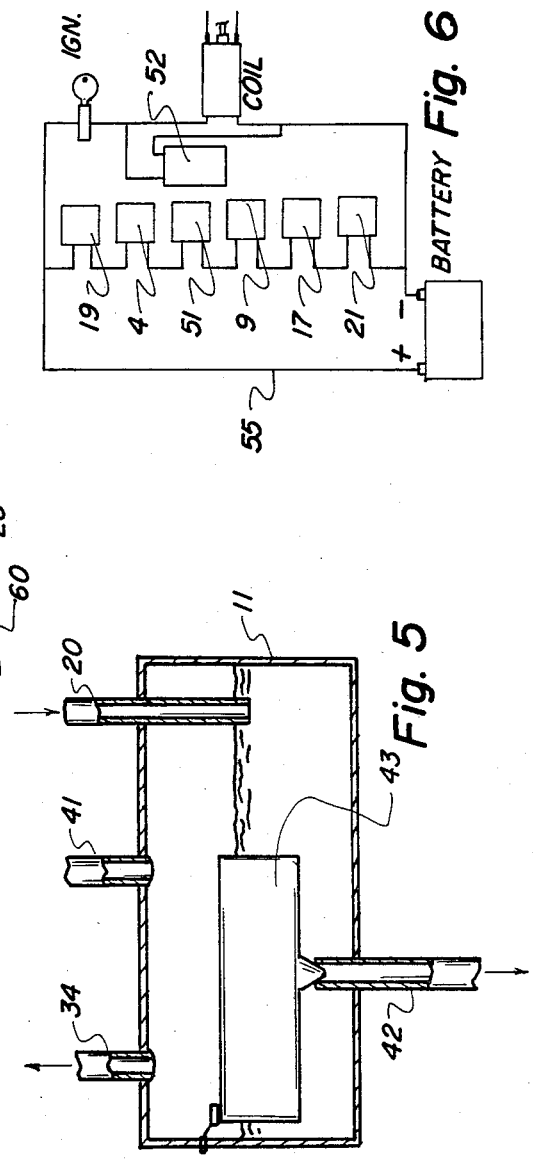

SYSTEM AND METHOD OF VAPORIZING
LIQUID FUEL FOR DELIVERY TO AN INTERNAL
COMBUSTION ENGINE

BACKGROUND OF THE INVENTION

1. Field

The present invention relates to apparatus and method for controlled vaporization of a liquid fuel and delivery of the vaporized fuel to an internal combustion engine. In particular, the invention relates to apparatus and method in which various liquid fuels can be used, wherein the vapors of the liquid fuels can be supplemented and mixed with a second fuel prior to being inducted into the cylinders of the internal combustion engine.

2. State of the Art

It is well known that liquid motor fuels that have been converted into the vapor state prior to being mixed with air in the carburetion process improves the operation of the engine and increases the mileage or work capacity of the vehicle and reduces the production of exhaust pollutants. The liquid fuel is converted into the vapor state to provide a more thorough blending with the intake air in the fuel/air mixing process. This in turn provides for a more even distribution of the fuel/air mixture to the engine's combustion chambers and produces an even flame advance when the fuel/air mixture is ignited in the combustion process. Combustion of the uniform fuel/air mixture provides additional driving force against the pistons as well as to achieve complete combustion of the fuel during the time used by the power stroke of the piston. The improved combustion results in increased power and work. The fuel burns completely, even when the engine is cold. This process eliminates liquid fuel in the cylinders, the dilution of the lubricating oil on the cylinder walls, emission of raw hydro-carbons, and engine life is greatly extended. The production of carbon monoxide is greatly reduced and the production of amorphous carbon is entirely eliminated. Finally, this system permits the use of lower cost, higher energy fuels from plant, animal or mineral sources and can help to supplement our fossil fuel reserves. Representative patents which discuss liquid fuel vaporization for use in internal combustion engines include U.S. Pat. Nos. 1,997,497; 2,026,798;

Objectives

It is a principal object of the present invention to provide an improved, novel system and method for introducing vaporized, liquid fuels into an internal combustion engine. The liquid fuels which are applicable are any of those which are in the liquid state under normal atmospheric temperatures and pressures and which will vaporize at temperatures below about 425° C. Such fuels include gasoline, diesel, alcohol, vegetable oils, animal oils and other hydrocarbons of various origin.

Another object of the invention is to provide an improved, novel system and method for introducing vaporized fuels into an internal combustion engine wherein vaporized components of two or more separate kinds of fuel may be blended in such a manner as to control proper combustion of the mixed fuels in the engine and to achieve the maximum possible level of performance and economy from the engine.

A further object of the invention is to provide an improved, novel system and method for introducing vaporized, liquid fuels into an internal combustion engine wherein the liquid fuel is vaporized at a rate not to exceed the rate at which the fuel is being consumed by the engine at any given time and performance level. This eliminates any need for producing and storing a reserve supply of fuel vapors in the area of the engine.

An additional object of the invention is to provide an improved, novel system and method for introducing vaporized, liquid fuels into an internal combustion engine wherein the liquid fuel is vaporized at the optimum temperature required to convert the fuel from the liquid state into the vapor state. The vaporized fuel is then transported or moved away from the source of heat so as to prevent the undesirable fractionation of the fuel which can result in the formation of gums and tars.

A still further object of the invention is to provide an improved, novel system and method for introducing vaporized, liquid fuels into an internal combustion engine wherein two or more distinct liquid fuels having different temperatures of vaporization may be introduced into the system at random or in mixtures, and each fuel will be automatically vaporized at its optimum vaporization temperature without any mechanical adjustment of the system being necessary.

An additional object of the present invention is to provide a system and method for introducing vaporized fuel into internal combustion engines which are otherwise designed for aspirating gasoline, propane, natural gas, methane, alcohol and other types of fuel.

SUMMARY OF THE INVENTION

The above and other objects of the invention are realized in a specific, illustrative embodiment of a vapor generating system for supplying vaporized fuels to an internal combustion engine, in which the system includes a first and second source of fuel. The first source of fuel comprises a supply of pressurized vapor fuel such as hydrogen, methane, natural gas, propane, butane, acetylene or any other fuel that is normally in the vapor state at atmospheric temperatures and pressures. The second source of fuel comprises a supply of liquid fuel such as diesel, kerosene, gasoline, alcohol or any other liquid fuel that is normally in the liquid state at atmospheric temperatures and pressures and wherein the liquid fuels will vaporize at a temperature below about 425° C.

Apparatus for vaporizing the liquid fuel from the second source of fuel is provided. The vaporizing apparatus utilizes heat from the engine, primarily heat from the exhaust of the engine, to vaporize the liquid fuel. The vaporized fuel is mixed with pressurized vapor fuel from the first source of fuel, and the mixture is introduced into the engine. Apparatus is provided for controlling the pressure of the pressurized vapor fuel from the first source of fuel and for automatically providing necessary amounts of the pressurized vapor fuel from the first source of fuel. When the engine is first started, very little heat is initially available for vaporizing liquid fuel from the second source of fuel, and pressurized vapor fuel is automatically provided to operate the engine. As vaporized liquid fuel is made available, the system automatically takes the vaporized liquid fuel and supplements the vaporized liquid fuel with pressurized vapor fuel only as needed to operate the engine. Means are provided for delivering liquid fuel from the second source of fuel to the vaporizing apparatus. As the liquid fuel is vaporized and used by the engine, makeup liquid fuel is supplied under controlled conditions to the vaporizing apparatus.

A system is provided for delivering fuel, either vaporized liquid fuel from the vaporizing apparatus, pressurized vapor fuel or mixtures of vaporized liquid fuel and pressurized vapor fuel, to the carburetor or fuel aspirating device of the internal combustion engine. This system is adapted to blend the available vapors and deliver the blended vapors to the engine. Pressure relief means is coupled into the liquid fuel vaporizing apparatus to vent vaporized fuel therefrom whenever the pressure within the vaporizing apparatus exceeds a certain predetermined value. The temperature of the vaporized fuel is thereby controlled by means of the relationship between temperature and pressure within the vaporizing apparatus. Means are advantageously provided for recycling the fuel vapors vented by the pressure relief mechanism.

A system is further provided for delivering a predetermined amount of the pressurized vapor fuel from the first source of fuel to the lower end of the liquid fuel vaporizing apparatus. The pressurized vapor fuel which is introduced into the liquid fuel vaporizing apparatus provides a pressure force which tends to move the liquid fuel which is vaporized in the vaporizing apparatus to the system for delivering the fuel to the carburetor of the engine. The pressurized vapor fuel introduced into the liquid fuel vaporizing apparatus becomes a portion of the total fuel delivered to the carburetor.

In a preferred embodiment of the invention, a condensing apparatus is provided between the pressure relief valve and the condensed liquid fuel collecting tank for quick removal of excess vapors from the liquid fuel vaporizing apparatus.

In addition, a liquid fuel volume metering valve can be provided in the system between the fuel pump and the liquid fuel vaporizing apparatus to control the volume of liquid fuel being delivered from the second source of fuel to the liquid fuel vaporizing apparatus. This latter valve is advantageously intercoupled with the throttle for operating to increase the rate of fuel delivery when the throttle is advanced and to decrease the rate of fuel delivery when the throttle is retarded, whereby the delivery of fuel is related to the demand of the engine.

In another preferred embodiment of the invention, a liquid fuel volume restrictor valve is provided in the system between the liquid fuel source and the liquid fuel volume metering valve to further monitor the rate of liquid fuel input into the vaporizing apparatus. The restrictor valve is advantageously intercoupled with the vaporizing apparatus for sensing pressure buildup in the vaporizing apparatus. If the fuel input becomes excessive, the resulting pressure buildup is transmitted to the restrictor valve and the valve reacts to restrict the fuel input until the pressure in the vaporizing apparatus is normal.

In an additional preferred embodiment of the invention, the vaporizing apparatus collects heat from the exhaust manifold of the engine for transferring the heat progressively from the source of heat toward the output end of the vaporizing apparatus. The vaporizing apparatus is disposed a predetermined distance above the source of heat for maintaining a continuous elevation from the source of heat to the output end of the vaporizing apparatus. The liquid fuel from the first source of fuel is delivered into the vaporizing apparatus near the output end of such apparatus, whereby the fuel is caused to flow downwardly toward the source of heat. The liquid fuel is progressively heated as it flows along the vaporizing apparatus and is ultimately vaporized. The resulting vaporized fuel is admixed with the pressurized vapor fuel and carried away from the source of heat. The admixture of vaporized fuels is then delivered into the vapor mixing apparatus by means of the vacuum force from the carburetor and the pressure force from the lower end of the liquid fuel vaporizing apparatus. This concept of using pressurized vapor fuel flow together with a vacuum developed by the carburetor, wherein vaporized fuel flows counterflow to liquid fuel in the vaporizing apparatus, permits use of a wide range of liquid fuels and vapor fuels without the need for adjustment of the vaporizing apparatus. There is no need to adjust for different temperatures required to vaporize each different fuel. The progressive heating of the liquid fuel automatically causes the fuel to vaporize at some given point between the point of entry and the lower end of the vaporizing apparatus, and the counterflowing pressurized vapor fuel automatically transports the vaporized fuel from the point of vaporization away from the source of heat for delivery to the engine.

In accordance with yet another preferred aspect of the invention a pressurized vapor fuel converter is provided for converting the highly pressurized vapor fuel from the first source of fuel to a lower pressure wherein the pressure can be further regulated to meet the requirements of the system. The converter operates to release pressurized vapor fuel to an additional pressure regulator for release to the vaporizing apparatus. The converter is also adapted to provide low pressure or essentially unpressurized vapor fuel to the vapor mixing conduit upon vacuum demand from the carburetor system. Thus, when the supply of pressurized vapor fuel and vaporized fuel from the vaporizing apparatus does not provide sufficient fuel to the carburetor, a sufficient vacuum develops in the vapor mixing conduit and the converter then releases low pressure or essentially unpressurized vapor fuel to the vapor mixing conduit to supply the demand of fuel by the engine.

In accordance with an additional aspect of the invention the vacuum force produced by the internal combustion engine is controlled by the carburetor throttle body, whereby more or less vacuum force may be admitted into the vapor mixing chamber. The vacuum force is applied to the three input conduits associated with the vapor mixing conduit for operating to pull vapor fuel from whichever of the input conduits is capable of delivering such fuel. The vacuum force is in essence, effective with respect to the line of least resistance which at times, may include one, two or all three of the input conduits. For example, if the vaporizing apparatus is not operational for whatever reason, the vacuum force will build up and effectively draw fuel from at least one of the two remaining input conduits. Initially, any accumulated vented vapor fuel from the vapor collecting canister will be drawn into the vapor mixing conduit, and when that potential is exhausted the vacuum force draws vapor fuel from the pressurized vapor fuel input conduit. The engine then operates on fuel from the first source of fuel until the vaporizing apparatus again becomes operational. This arrangement assures that the fuel requirements of the engine will be met under all circumstances, and that the fuel will always be in the vapor state, regardless of the temperature of the engine or other considerations. Apparatus may also be provided for delivering a volume of low pressure/low temperature steam to the intake air of the carburetor dependent upon the speed of the engine. The above features of the invention provide for more complete combustion of the fuel and the related improvement in engine efficiency and the reduction of harmful exhaust pollutants.

BRIEF DESCRIPTION OF THE DRAWINGS

The above and other features, objects and advantages of the invention will become apparent from a consideration of the following detailed description presented in connection with the accompanying drawings in which:

FIG. 2 is a horizontal, cross-sectional view of the high temperature heat exchanger 5 of FIG. 1;

FIG. 3 is a vertical, cross sectional view of the high temperature heat chamber 5 of FIGS. 1 and 2;

FIG. 4 is a cross-sectional view of the copper channel 31 disposed within the interior of the counterflow vaporizing tube 6 of FIG. 1;

FIG. 5 is a cross-sectional side view of the salvaged liquid fuel collector 11 of FIG. 1;

FIG. 6 is a schematic view of the wiring harness 55 for intercoupling the electrical devices of the vapor generating and delivering system.

DETAILED DESCRIPTION OF THE ILLUSTRATED EMBODIMENTS

Figure 1:
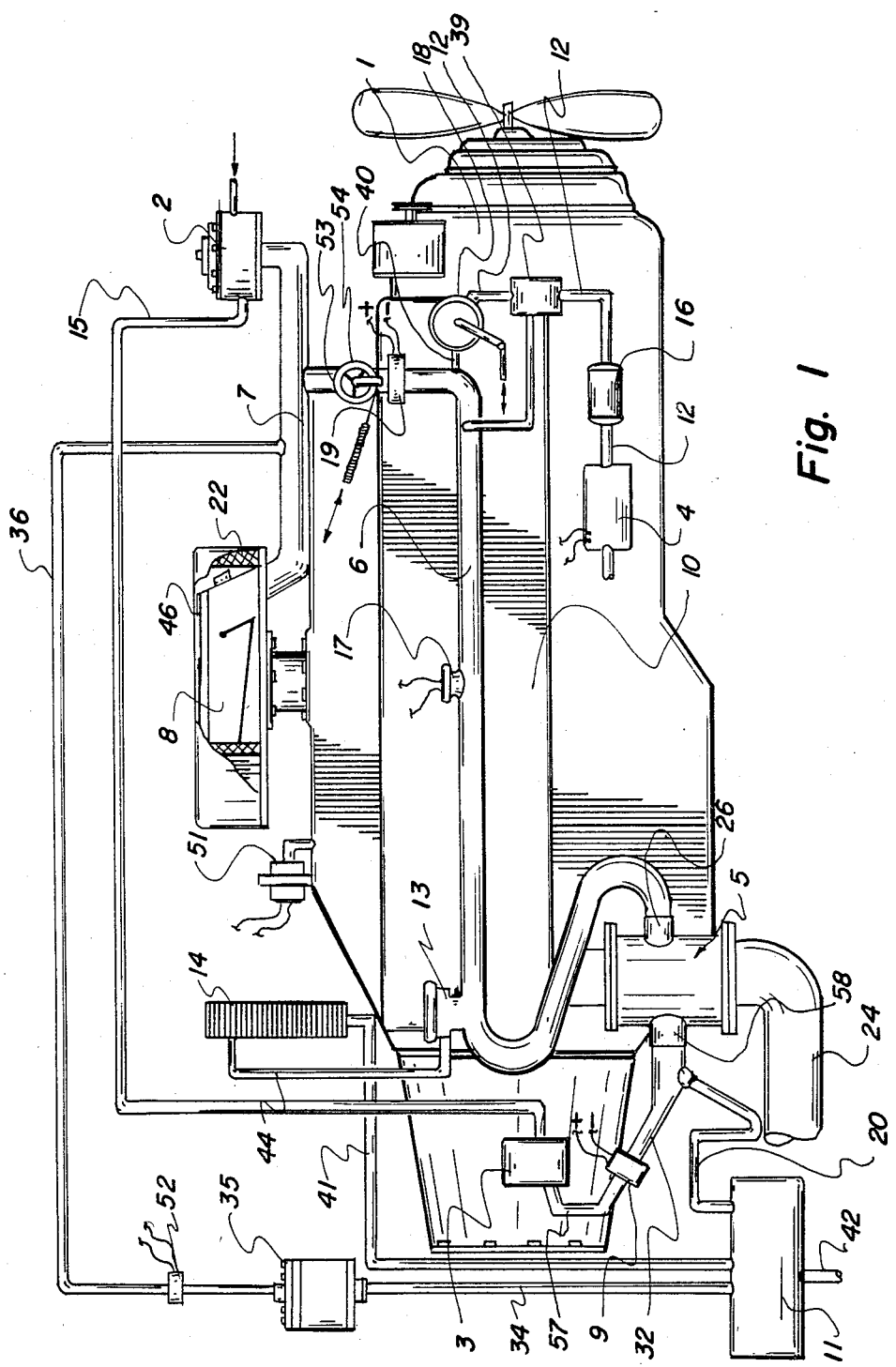
FIG. 1 is a schematic presentation of an internal combustion engine incorporating a vapor generating and delivering system in accordance with the principles of the present invention.

Refering to FIG. 1 there is shown a specific, illustrative embodiment of a fuel vapor generating and delivering system in accordance with the present invention and used in connection with an internal combustion engine 1. The elements of the fuel vapor generating and delivering system as will be fully described below interact to control fuel input into the carburetor 8 of the engine 1 in direct relation to throttle advance, engine vacuum, engine temperature and fuel/air ratios.

The fuel vapor generating and delivering system of the invention comprises a first source of fuel, a second source of fuel, and a modified vapor fuel type carburetor 8. A pressure converter 2 is provided for modifying the vapor pressure of the fuel from the first source of fuel which is stored under high pressure. The converter 2 has a first output orifice for releasing pressurized vapor fuel at a predetermined pressure and a second output orifice for releasing the pressurized vapor fuel at a low pressure when a predetermined vacuum is applied to the second output orifice. The vacuum is increased or decreased by throttle advance or retardation as is well known with internal combustion engines. The first output orifice, for releasing the pressurized vapor fuel at a predetermined pressure, is intercoupled with a pressurized vapor conduit 15. The vapor conduit 15 operates to deliver the pressurized vapor fuel to vapor pressure regulator 3 for further pressure adjustment. The second output orifice, for operating to release the pressurized vapor fuel at vacuum demand is intercoupled with a vapor mixing conduit 7 to the carburetor 8 of the engine 1. Vapor fuel from the second output orifice of the converter 2 is introduced into the vapor mixing conduit 7 whenever vacuum in the vapor mixing conduit 7 builds to and exceeds a certain predetermined level.

The converter 2, of course, has an input nipple, nozzle or orifice which is in flow communication with the first source of fuel. The first source of fuel may be a pressurized tank containing a fuel which is normally in the vapor state at atmospheric conditions. The fuel of the first source of fuel may be methane, propane, butane, acetylene, liquid petroleum gas, etc., which is maintained under pressure within the pressurized tank. The converter 2 and the pressure regulator 3 are of the type well known in the art for controlling pressurized gases from a high pressure source of the gas. The converter 2 may be of the type conventionally used in converting gasoline engines to operate on butane, propane and liquified natural gas. Of course, the converter 2 must be adapted to provide controlled pressurized fuel vapor at a first orifice and low pressure fuel vapor at a second orifice as discussed above.

The vapor pressure regulator 3 is connected to a vapor lockoff valve 9 via the vapor pressure conduit 57. The vapor lockoff valve 9 is adapted to deliver the pressurized vapor fuel from regulator 3 to a heat exchanger 5 which is located at the lower end of a counterflow vaporizing tube 6. The pressurized vapor fuel is transferred from the valve 9 to the heat exchanger 5 via way of the conduit 32. The operation of the heat exchanger 5 and the counterflow vaporizing tube 6 is dependent upon serveral variables. These variables and specific elements for monitoring the variables and controlling the operation of the heat exchanges and vaporizing tube will be discussed fully hereinafter. For the time being, it is sufficient to note that the heat exchanger is connected to the exhaust manifold 10 of the engine 1 such that the exhaust gases from the engine 1 pass through the heat exchanger 5 and then to the exhaust pipe 24.

The heat tube 6 is an elongate tube which is attached at one of its ends to the heat exchanger 5 and slopes generally upwardly therefrom. The degree of slope is not critical per se. What is necessary is simply that the tube 6 be positioned such that when a liquid fuel is introduced into the tube 6 at its end opposite the heat exchanger 5, the liquid fuel will flow down the tube 6 toward the heat exchanger 5. As illustrated, the main portion of the tube 6 may have a length of several feet. The main portion of the tube 6 may lie substantially along the length of the engine 1, with the slope of the tube 6 being quite gradual, i.e., just sufficient to cause liquid fuel to flow under gravity from the upper end toward the lower end. The lower end of the tube 6 could be connected directly to the heat exchanger 5, or as shown in the drawings, an intermediate connection may be made by a bent adapter tube which is connected to the heat exchanger 5 somewhat below the general level of the main portion of the tube 6.

For purposes which will be explained hereinafter, a copper channel 31 (see FIG. 4) is positioned within the tube 6. The copper channel 31 need not encompass the entire interior surface of the tube 6, but is positioned along the lower internal surface of the tube 6 as shown in FIG. 4. The channel 31 fits snugly adjacent to the tube 6 so as to maximize thermal heat transfer between the channel 31 and the tube 6. The channel 31 is positioned such that the liquid fuel which is introduced into the upper end of the tube 6 flows down the tube 6 within the channel 31.

The lower end of the counterflow vaporizing tube 6 is coupled to the heat exchanger 5 wherein heat is extracted from the exhaust gases and the exhaust gas manifold and transferred to the counterflow vaporizing tube 6 and the channel 31 disposed therein. As illustrated in FIG. 2 and 3, the heat exchanger advantageously comprises an outer shell or conduit 33 having flanges 28 and 29 at its opposite ends. The flange 28 is adapted to be connected to the outlet of the gas exhaust manifold of the engine 1, and the flange 29 is adapted to be connected to the intake end of the exhaust pipe 24 of the engine 1. Thus, the hot exhaust gases from the exhaust manifold pass through the heat exchanger 5 on their way to the exhaust pipe 24.

The hot, exhaust gases preferably pass through an inner conduit 23 which is coaxial with the outer conduit 33. The inner conduit 23 is connected to the flanges 28 and 29 such that a cylindrical space is formed between the inner and outer conduits 23 and 33, respectively. Nipples 26 and 58 are connected generally opposite each other to the sidewall of the outer conduit 33. The nipples 26 and 58 open through the outer conduit 33 to the cylindrical space formed between the outer conduit 33 and the inner conduit 23. Aligned openings are provided in the inner conduit 23, and a heat exchange conduit 30 is inserted through the openings in the inner conduit 23 so as to extend across the inner conduit 23. The conduit 30 is attached, such as by welding, at each of its ends to the inner conduit 23 so that there is no flow communication between the inner conduit 23 and the heat exchange conduit 30, i.e., hot exhaust gases from the inner conduit 23 cannot enter the heat exchange conduit 30. A pair of heat collecting plates 56 and 60 can be provided above and below the heat exchange conduit 30 in the inner conduit 23. As illustrated in FIGS. 2 and 3, the heat collecting plates comprise pairs of plates attached together in the form of a symmetrical X, with the outer edges of the plates being connected to the inner conduit 23. The plates 56 and 60 promote heat exchange from the hot exhaust gases to the inner conduit 23 and the heat exchange conduit 30.

The nipple 26 of the heat exchanger 5 is adapted to be connected to the lower end of the counterflow vaporizing tube 6. The heat exchange conduit 30 of the heat exchanger 5 preferably has a cross sectional dimension which is somewhat less than the corresponding cross sectional dimensions of the nipple 26 and heat vaporizing tube 6. The heat exchange conduit 30 further preferably extends into the nipple 26, with the channel 31 of the vaporizing tube 6 extending to about the end of the conduit 30. In this manner, heat is more effectively transferred from the conduit 30 to the channel 31, and any liquid fuel flowing downwardly in channel 31 will flow directly into the conduit 30.

The nipple 58 of the heat exchanger 5 is adapted to be connected to the conduit 32 which transfers pressurized vapor fuel from the valve 9 to the heat exchanger 5. The pressurized vapor fuel may pass through the heat exchange conduit 30 to vaporizing tube 6, or the pressurized vapor fuel can flow to the vaporizing tube 6 through the passage around the inner conduit 23 formed by the space formed between the inner conduit 23 and the outer conduit 33.

The upper end of the vaporizing tube 6 is connected to the mixing conduit 7 between the carburetor 8 and the vapor fuel converter 2. A fuel pump 4 is adapted to deliver liquid fuel, such as gasoline, diesel, kerosene, alcohol, animal oils, vegetable oils or any other liquid fuel material which will vaporize at a temperature of less than about 425°C., from a second source of fuel to the liquid fuel delivering conduit 12. A liquid pressure regulator 16 can be incorporated into the conduit 12 to regulate the pressure of the liquid fuel from the fuel pump 4. A volume restrictor valve 39 and a volume metering valve 18 are also provided in the conduit 12.

The valves 39 and 18 are responsive to throttle advance, pressure in the vaporizing tube 6 and intake manifold vacuum. Under proper conditions, the valves 39 and 18 permit liquid fuel to be delivered into the upper end of the vaporizing tube 6 wherein it is channeled into the copper channel 31 and caused to flow by gravity toward the source of heat, ie., the heat exchanger 5. The liquid fuel is progressively heated by heat conducted from the heat exchanger by the tube 6 and the channel 31. In addition, the heated, pressurized vapor fuel, which is flowing from the heat exchanger 5 to the mixing conduit 7, acts to heat the liquid fuel. As the liquid fuel is heated, it is progressively vaporized, and the resulting vaporized liquid fuel is swept along with the pressurized vapor fuel to the mixing conduit 7 for ultimate delivery to the carburetor 8 of the engine 1.

As can be seen, the engine thus operates on vapor fuel which is (1) a mixture of vaporized liquid fuel and normally vapor fuel, or (2) predominantly vaporized liquid fuel, or (3) predominantly the normally vapor fuel, depending upon the operating conditions of the engine. When the engine is initially started, it is evident that there will be insufficient heat available to vaporize liquid fuel. With insutficient vaporized fuel being produced by the vaporizing tube 6 the manifold vacuum builds in the mixing conduit 7. As the vacuum builds in the conduit 7, the vapor fuel converter 2 is activated to release low pressure vapor fuel to the mixing conduit 7 and ultimately the carburetor 8. The engine 1 thus operates essentially exclusively on vapor fuel at start up. As the engine warms up, and heat is available through the heat exchanger 5, liquid fuel begins to vaporize in the vaporizing tube 6. The vaporized liquid fuel is then mixed with the vapor fuel in the mixing conduit 7. The engine 1 thus operates on a mixture of fuels during this period. As the vapor generating capability of the vaporizing tube 6 is increased, sufficient vapor fuel resulting from the vaporization of the liquid fuel is available to operate the engine 1. Under these circumstances, the vacuum drops in the mixing conduit 7, and the converter 2 stops supplying low pressure vapor fuel to the mixing conduit 7. The engine 1 then operates on predominantly vaporized liquid fuel. Some vapor fuel, which flows in counterflow through the vaporizing tube 6 to aid in sweeping the vaporized liquid fuel to the mixing chamber, will always be present with the vaporized liquid fuel from the vaporizing tube 6.

The operation of the system is dependent upon the amount of throttle advance, the level of vacuum developed in the mixing conduit 7 by the intake manifold and the carburetor 8 of the engine 1 and the temperature in the counterflow vaporizing tube 6. Control means are provided for monitoring and reacting to the variables on which the system is dependent. A thermal switch 17 is provided on the vaporizing tube 6. A vacuum switch 51 is provided on the manifold of the engine 1. A throttle advance switch 21 (FIG. 6) is provided in association with the throttle cable. A lockoff valve 19 is provided in the upper end of the vaporizing tube 6 between the point where liquid fuel is introduced into the vaporizing tube and the connection of the vaporizing tube to the mixing conduit 7. The lockoff valve 9, which is provided in the pressurized vapor fuel feed to the heat exchanger 5, the fuel pump 4 and the other control members mentioned above, i.e., the switches 51, 17 and 21 and the valve 19 are connected electrically in series in a wiring harness 55 as shown diagramatically in FIG. 6. The wiring harness further contains a lockoff valve 52 which is incorporated into a vapor recovery system which will be more fully described hereinafter.

The thermal switch 17 closes only when there is sufficient heat being supplied to the vaporizing tube 6 as measured by the temperature of the tube 6. The vacuum switch 51 closes only when the engine 1 is being operated under conditions of a preset degree of fuel requirement, i.e., when the vacuum in the manifold exceeds a preset level. The throttle advance switch 21 closes only when the throttle is advanced to a predetermined amount. With the switches 17, 51 and 21 all closed, electrical current is transmitted to the valves 19, 9 and to the fuel pump 4 to open the valves and turn on the fuel pump. The vaporizing tube 6 then becomes operational and liquid fuel is introduced thereinto. If any of the switches 17, 51 and 21 open, then the cirucit is open in the wiring harness, and the valves 19 and 9 close, while the fuel pump 4 turns off. While the vaporizing tube 6 is being maintained in operating condition, i.e., switches 17, 51 and 21 are closed, the vapor mixing conduit 7 is still responsive to vacuum from the carburetor and manifold and to the vapor pressures developed by the vaporizing tube 6 to draw fuel from the vaporizing tube 6 predominantly or to draw a mixture of fuel from the vaporizing tube 6 and the vapor fuel converter 2. Even with the vaporizing tube 6 in operation, increased loads on the engine 1 may require that supplemental fuel be drawn from the vapor fuel converter 2. Thus, if the load on the engine is such that the fuel requirements cannot be met with vaporized liquid fuel from the vaporizing tube 6, the vacuum builds in the mixing tube 7 and the converter 2 is activated to supply necessary supplemental vapor fuel from the high pressure source of vapor fuel.

When the engine 1 is turned off, the vacuum switch 51 opens. This in turn opens the circuit in the wiring harness 51 containing valves 19 and 9 and fuel pump 4. The valves 19 and 9 close so that vaporized liquid fuel cannot build up in the mixing conduit 7 and carburetor 8. Additionally, the fuel pump 4 is turned off so as to terminate fuel feed to the vaporizing tube 6. The residual amount of liquid fuel which may be vaporized after the engine 1 has been turned off is recovered in a vapor recovery system which will be described subsequently.

During normal operation of the vaporizing tube 6, liquid fuel is pumped by pump 4 from a second source of fuel, i.e., the source of the liquid fuel such as the fuel line from a conventional liquid fuel tank. The pump 4 delivers the liquid fuel to the liquid fuel delivering conduit 12 wherein the pressure of the fuel is regulated by the liquid fuel pressure regulator 16, the volume restrictor valve 39 and the volume metering valve 18 in response to throttle advance, pressure in the vaporizing tube 6 and intake manifold vacuum. The pressure regulator 16 is a conventional regulating device for maintaining a preset regulated pressure on the liquid fuel from the pump 4. The regulator 16 is disposed in the fuel delivering conduit 12 between the pump 4 and the volume restrictor valve 39.

The volume restrictor valve 39 is disposed in the fuel delivering conduit 12 between the pressure regulator 16 and the volume metering valve 18. The volume restrictor valve 39 is provided to cut off liquid fuel delivery to the vaporizing tube 6 whenever the pressure in the vaporizing tube exceeds a preset limit. The volume restrictor valve 39 comprises a conventional diaphram valve. The diaphram is adapted to stop flow of liquid fuel through the valve 39 when a preset pressure is applied to the diaphram. A pressure transmitting conduit 45 extends between the valve 39 and the vaporizing tube 6. Pressure in the vaporizing tube 6 is transmitted through the conduit 45 to the diaphragm in the valve 39. At or above a preset pressure, the diaphragm closes the valve 39 and stops liquid fuel from flowing to the vaporizing tube 6. The pressure regulator 16 discussed above provides a regulated pressure which is within the operating limits of the restrictor valve 39.

The volume metering valve 18 is disposed between the restrictor valve 39 and the inlet to the vaporizing tube 6. The metering valve 18 is intercoupled with the throttle of the engine 1 by means of a flexible sheathed wire or cable. When the throttle is advanced, the volume metering valve 18 opens in direct ratio with the advance of the throttle. In this manner, the liquid fuel from the second source of fuel is delivered to the vaporizing tube 6 in direct proportion to the fuel demand of the engine 1. Should the rate of vaporized fuel being produced by the vaporizing tube 6 be less than the fuel demand of the engine 1, the resulting vacuum increase in the vapor mixing conduit 7, as explained previously, activates the converter 2 to release low pressure vapor fuel from the first source of fuel to supplement the vaporized fuel from the vaporizing tube 6. The converter 2 supplies the needed supplemental fuel requirements until such time as the vaporized fuel from the vaporizing tube 6 is supplied in the required amount. As the vaporized fuel from the vaporizing tube 6 is produced in the required amounts, the vacuum in the mixing conduit 7 drops, and the converter 2 stops supplying the low pressure vapor fuel from the first source of fuel. Should the rate of vaporized fuel being produced by the vaporizing tube become excessive, i.e., more than that which is required by the engine 1, the pressure builds in the vaporizing tube 6, and the increased pressure is applied to the volume restrictor valve 39 through conduit 45 to restrict the input of liquid fuel being delivered to the vaporizing tube 6.

Whenever the throttle is retarded below a predetermined amount, with the engine 1 working with only a small load and, thus, a reduced fuel requirement, the throttle advance switch 21, which is mechanically operated by the throttle, is turned off. This turns the pump 4 off and also closes the lockoff valves 9 and 19. The vacuum will, of course, increase in the mixing conduit 7, and the converter 2 will provide low pressure vapor fuel from the first source of fuel in sufficient amounts to maintain operation of the engine 1.

A system is advantageously provided for recovering unused or vented fuels from the vaporization tube 6 whenever for one purpose or another the operation of the vaporization tube 6 is discontinued. At any time when the control system for the vaporization tube 6 stops the operation thereof by stopping the pump 4 and closing the lockoff valves 9 and 19, there will be residual liquid fuel in the vaporization tube. The residual liquid fuel will, of course, be subject to vaporization following the closing of the lockoff valves 9 and 19. A venting and recovery system is preferably provided so as to vent vaporized fuel from the vaporizing tube 6 to prevent over pressurization of the tube 6 and to recover the vented vaporized fuel.

The venting and recovery system comprises a pressure relief valve 13 which is in flow communication with the vaporization tube 6 and operates to vent vaporized fuel from the tube 6 whenever the vapor pressure in the tube 6 exceeds a predetermined amount. The vented vaporized fuels will consist of vaporized liquid fuel and the pressurized vapor fuel which has been admitted to the tube 6 from the converter 2. The vented, vaporized fuels are delivered to a condensing unit 14 via way of a vapor conduit 44 which connects the condensing unit 14 to the relief valve 13. The condensing unit 14 is a conventional tube and fin unit as used in air conditioning units and for water cooling radiators on automobiles.

The vaporized liquid fuel is condensed from the vapor state to a liquid state in the condensing unit 14. Any vapor fuel from the first source of fuel which is present in the vented vaporized fuels will not be condensed in the condensing unit 14 but will remain in the vapor state. The noncondensible, vapor fuel component, if any, and the condensed liquid fuel are delivered from the condensing unit 14 to the liquid fuel overflow collector 11 via the conduit 44. The noncondensible, vapor fuel component is further transfered from the liquid fuel overflow collector 11 to a vapor collecting canister 35.

As shown in FIG. 5, the overflow collector 11 preferably has a float valve 43 and a discharge conduit 42 which will deliver the liquid fuel from the collector 11 to the source of the liquid fuel, i.e., the liquid fuel storage tank. The float valve 43 works such that liquid fuel is expelled from the collector 11 only when the liquid fuel accumulates to a level to raise the float and thus open the float valve. By thus maintaining a liquid level above the cone valve of the float valve 43, any noncondensible vapor fuel entering the collector 11 will be separated from the liquid fuel, and the vapor fuel will not be able to exit the collector 11 via way of the discharge conduit 42. The vapor fuel will be directed through conduit 34 to the vapor collecting canister 35.

A vapor fuel return conduit 36 extends from the vapor collecting canister 35 to the vapor mixing conduit 7. During operation of the engine 1, the vacuum existing in the vapor mixing conduit 7 will draw the vapor fuel from the canister 35 to the conduit 7 to be fed to the carburetor 8 of the engine 1. A lockoff valve 52 is provided in the vapor fuel return conduit 36. The lockoff valve 52 is electrically operated in conjunction with the ignition switch. When the ignition switch is on, the lockoff valve 52 is open. When the ignition switch is off, the lockoff valve is closed. This prevents undesirable emission of vapor fuels from the vapor collecting canister 35 during periods in which the engine 1 is not being used.

Any liquid fuel from the second source of fuel that is introduced into the vaporizing tube 6 and may have traversed the length of the vaporizing tube 6 without becoming vaporized is withdrawn from the vaporizing tube 6 at the lower end thereof and delivered to the liquid fuel overflow collector 11 via the salvaged liquid fuel conduit 20. A P-trap can be provided in the conduit 20 to prevent loss of vaporized fuel and vapor fuel from the tube 6 through the conduit 20. Alternatively, a valve which will pass only liquid (such as used in condensate lines of high pressure steam systems) can be incorporated into conduit 20.

An auxilliary air valve 22 can be provided on the air gate of the carburetor 8. The air valve is intercoupled with the volume metering valve 18 by means of a flexible, sheathed control wire or cable such that the air valve 22 is adapted to increase the air supply to the carburetor 8 as the volume metering valve 18 opens to increase the input of liquid fuel into the vaporizing tube 6. The air valve is further adapted to interact with the engine vacuum and the throttle advance to open and provide more air when the throttle is advanced and the vacuum is below a predetermined level. The interaction between the engine vacuum and throttle advance can be employed to decrease the liquid fuel input when the engine vacuum decreases to a predetermined level. For example, under high engine load, the engine vacuum falls. When the engine vacuum falls to a predetermined value, the vacuum switch 51 is activated, and the lockoff valves 9 and 19 are closed. Vacuum in the vapor mixing conduit 7 rises, and the converter 2 supplies vapor fuel in amounts required by the engine 1. The vapor fuel from the converter 2 requires less oxygen for combustion than the vaporized liquid fuel. Thus at high loads on the engine, the system of the present invention automatically adjusts to operate on the vapor fuel which requires less oxygen or air intake in the carburetor 8.

It is the purpose of this invention to provide fuel to the carburetor of the internal combustion engine wherein all of the fuel is prevaporized prior to carburetion, so that the fuel/air mixture delivered to the engine consists entirely of vapors. By operating on vapor fuel, more complete mixing of the fuel and the air is achieved, and combustion of the fuel/air mixture can be more complete and productive. It is a further purpose of the invention to permit the use of two or more kinds of fuels. One of the fuels available is a vapor at atmospheric conditions, so that the carburetor has access to vaporized fuel even though the temperature of the engine is too low to support vaporization of the second fuel, i.e., the liquid fuel. The fuel from the first source of fuel is always delivered to the carburetor in the vapor state. It will burn completely, even when the engine is cold and will not dilute the engine's lubricating oil as liquid fuels do when the engine is cold. The need for "choking" the carburetor or the engine is eliminated, the air to fuel ratio is always favorble to the most efficient combustion process at all ranges of temperatures.

It is to be understood that the above described arrangements are only illustrative of the application of principles of the present invention. Numerous modifications and alternative arrangements may be devised by those skilled in the art without departing from the spirit and scope of the present invention and the appended claims are intended to cover such modifications and arrangements.

I claim:

1. An improved fuel supply system for use with an internal combustion engine having a carburetor with an air intake, a vapor fuel intake and a mixing chamber for mixing the vapor fuel with the air, said improvement comprising a fuel mixing chamber which is in flow communication with said vaporized fuel intake of said carburetor and is adapted to feed vapor fuel to said vaporized fuel intake;

a source of first fuel that exists in the vapor state at normal atmospheric pressures and temperatures;

a source of second fuel that exists in the liquid state at normal atmospheric pressures and temperatures;

means for feeding said first fuel to said fuel mixing chamber;

vaporizing means for heating a liquid fuel and converting the liquid fuel into the vapor state;

means for feeding said second fuel in the liquid state to said vaporizing means;

means for delivering vaporized fuel from the vaporizing means to said fuel mixing chamber; and means for automatically controlling the feed of said first fuel to said mixing chamber such that vaporized second fuel is preferentially used in amounts as available from the vaporizing means to provide the fuel requirements of the engine, and said first fuel is fed to the mixing chamber in amounts as necessary to supplement the second fuel when the supply of vaporized second fuel from said vaporizing means is inadequate or in amounts up to the total fuel requirements of the engine whenever said vaporizing means is inoperative or otherwise not producing vaporized second fuel.

2. An improved fuel supply system in accordance with claim 1, wherein the first fuel is under pressure at its source; the means for controlling the feed of said first fuel to said mixing chamber comprises a pressure regulating means which is connected to the source of pressurized first fuel; and the pressure regulating means is adapted to release said first fuel to said mixing chamber whenever the vacuum developed in the mixing chamber by the carburetor of the engine builds to or exceeds a preset value.

3. An improved fuel supply system in accordance with claim 1 wherein a fuel pump is provided to pump the liquid fuel from the source of second fuel to a liquid fuel delivering conduit which is connected to the vaporizing means; a volume restrictor valve is provided in the liquid fuel delivering conduit, with the volume restrictor valve being adapted to stop the flow of liquid fuel in said liquid fuel delivering conduit whenever the pressure in the vaporizing means attains or exceeds a preset value; and a volume metering valve is provided in the liquid fuel delivering conduit between the volume restrictor valve and the vaporizing means, said volume metering valve being adapted to be responsive to the throttle advance of the internal combustion engine such that the volume metering valve is opened and closed in direct response to the movement of the throttle on the engine and whereby the rate of liquid, second fuel input to the vaporizing means is adjusted in direct response to the fuel demand of the engine.

4. An improved fuel supply system in accordance with claim 3, wherein a switch is provided on the throttle mechanism of the engine, with the switch being adapted to turn the fuel pump off whenever the throttle is retarded and to turn the fuel pump on when the throttle is advanced to or beyond a preset point in the movement of the throttle.

5. An improved fuel supply system in accordance with claim 1, wherein the internal combustion engine has an exhaust manifold, and the vaporizing means comprises a heat exchange means associated with the exhaust manifold, said heat exchange means being adapted to exchange heat from the hot exhaust gases from the exhaust manifold to heat and vaporize the liquid, second fuel.

6. An improved fuel supply system in accordance with claim 5, wherein the vaporizing means further comprises a vaporizing tube attached at one end to the heat exchange means and extending at least slightly upwardly therefrom, said vaporizing tube being adapted to have liquid second fuel introduced thereto a point close to or adjacent the other end of said vaporizing tube such that the liquid fuel will flow under gravity from the input toward the heat exchange means, and further wherein said vaporizing tube conducts heat from the heat exchanger to the liquid second fuel to heat and vaporize the liquid second fuel as the liquid second fuel flows down through said vaporizing tube.

7. An improved fuel supply system in accordance with claim 6, wherein the vaporizing tube has a copper channel disposed along the length thereof such that the liquid second fuel flows along the copper channel and the copper channel conducts heat from the heat exchange means to the liquid second fuel.

8. An improved fuel supply system in accordance with claim 6, wherein the upper, other end of said vaporizing tube is connected in flow communication with said fuel mixing chamber, and a lockoff valve is disposed in the vaporizing tube between the liquid second fuel inlet thereto and the other end thereof which is connected to the fuel mixing chamber, said lockoff valve being adapted to open when the vaporizing tube is operating to vaporize the liquid second fuel and to close whenever the vaporizing tube is turned off or ceases operation.

9. An improved fuel supply system in accordance with claim 8, wherein a temperature activated switch is associated with the vaporizing tube, with the switch being turned on only when the temperature in the vaporizing tube has achieved or exceeds a preset value, a throttle advance switch is provided in association with the throttle of the engine, with the throttle advance switch being turned on only when the throttle of the engine is advanced to or beyond a preset setting, and a vacuum switch is provided in flow communication with the vacuum manifold of said engine, with the vacuum switch being turned on only when the vacuum in the vacuum manifold is at or exceeds a predetermined value, and further wherein the temperature activated switch, the throttle advance switch and the vacuum switch are connected together in series with the lockoff valve in the vaporizing tube, such that if any one or more of the temperature activated switch, the throttle advance switch or the vacuum switch are turned off, the lockoff valve will be closed.

10. An improved fuel supply system in accordance with claim 9, wherein the fuel pump is connected in series with the lockoff valve in said vaporizing tube, so that the fuel pump will be turned off anytime that the lockoff valve is closed.

11. An improved fuel supply system in accordance with claim 9, wherein the first fuel is under pressure at its source; the means for controlling the feed of the first fuel to said mixing chamber comprises a pressure regulating means which is connected to the source of pressurized first fuel; the pressure regulating means has a first output which is coupled to said mixing chamber and is adapted to release said first fuel to said mixing chamber whenever the vacuum developed in the mixing chamber by the carburetor of the engine builds to or exceeds a preset value; said pressure regulating means further having a second output which is adapted to release said first fuel at a regulated pressure; a first fuel conduit attached at one end thereof to the second output of said pressure regulating means, said first fuel conduit being connected at its other end to the lower end of the vaporizing tube whereby pressurized first fuel is flushed through the vaporizing tube countercurrent to the flow of liquid fuel, such that the flow of pressurized first fuel aids in flushing vaporized second fuel from the vaporizing tube to said fuel mixing chamber; and a lockoff valve is positioned in the first fuel conduit, with the lockoff valve in the first fuel conduit being adapted to be closed whenever the lockoff valve in the vaporizing tube is closed and to be opened whenever the lockoff valve in the vaporizing tube is opened.

12. An improved fuel supply system in accordance with claim 9, wherein a pressure relief means is disposed in the vaporizing tube, said pressure relief means being adapted to open and vent vaporized second fuel from said vaporizing tube when the pressure therein is at or exceeds a preset amount and to close when the pressure is below the preset amount.

13. An improved fuel supply system in accordance with claim 12, wherein means are provided for removing any unvaporized, liquid, second fuel that may flow to the lower end of said vaporizing tube.

14. An improved fuel supply system in accordance with claim 13, wherein fuel salvage means are provided for recovering the fuel vented by said pressure relief means and the fuel removed from the lower end of said vaporizing tube.

15. An improved fuel supply system in accordance with claim 14, wherein the fuel salvage means comprises
   a fuel salvage tank;
   a condensing conduit means which is connected at its one end to the pressure relief means on said vaporizing tube and to a fuel salvage tank at its other end, said condensing conduit means being adapted to condense vaporized second fuel from the fuel vented by said pressure relief valve and to deliver the condensed second fuel to said fuel salvage tank;
   a vapor collecting canister;
   a vapor transfer conduit connected at its one end to the fuel salvage tank and at its other end to said vapor collecting canister;
   a vapor fuel return conduit connected at its one end to said vapor collecting canister and its other end to said fuel mixing chamber; and
   a liquid fuel overflow conduit connected at its one end to the lower end of said vaporizing tube and at its other end to said fuel salvage tank.

16. An improved fuel supply system in accordance with claim 1, wherein the first fuel is under pressure at its source; the means for controlling the feed of said first fuel to said mixing chamber comprises a pressure regulating means which is connected to the source of pressurized first fuel; and the pressure regulating device is adapted to release vapor fuel therefrom to said mixing chamber in proportion to the increase above a preset valve of the vacuum within said mixing chamber, whereby when vaporized fuel is being produced in the vaporizing tube and delivered to said mixing chamber, the vacuum in the mixing chamber is decreased and the release of first fuel to said fuel mixing chamber is decreased or stopped.

17. A method of introducing fuel into the carburetor of an internal combustion engine, said carburetor being of the type which is adapted to operate on a vapor fuel input, said method comprising
   providing a first source of pressurized vapor fuel, said vapor fuel being one that is in the vapor state at atmospheric temperature and pressures;
   providing a second source of liquid fuel, said liquid fuel being one that exists in the liquid state at atmospheric temperatures and pressures;
   providing means for heating liquid fuel from the second source and converting the heated liquid fuel into vaporized fuel;
   delivering liquid fuel from the second source of fuel to the means for heating and vaporizing the liquid fuel;
   delivering the vaporized fuel from the means for heating and vaporizing the liquid fuel to a fuel mixing chamber or conduit;
   providing a vacuum activated valve in combination with said first source of fuel, wherein the vacuum activated valve will release vapor fuel from the first source of fuel to said fuel mixing chamber whenever a sufficient vacuum is developed in said fuel mixing chamber;
   delivering vapor fuel from said fuel mixing chamber to said carburetor such as to develop a sufficient vacuum within said fuel mixing chamber to release vapor fuel from said activated valve whenever vaporized fuel from the second source of fuel is not being produced;
   delivering vaporized fuel from said fuel mixing chamber to said carburetor whenever vaporized fuel is being produced and delivered to said fuel mixing chamber in sufficient amount to maintain a vacuum less than that necessary to activate the vacuum activated valve;
   delivering a mixture of vapor fuel and vaporized fuel from said fuel mixing chamber to said carburetor whenever the vaporized fuel is being produced and delivered to the fuel mixing chamber in small enough amounts that the vacuum developed in said fuel mixing chamber activates the vacuum activated valve to release vapor fuel into the fuel mixing chamber along with the vaporized fuel.

18. A method of introducing fuel into the carburetor of an internal combustion engine as claimed in claim 17 wherein the vapor fuel from the first source of fuel has a high octane rating and a low BTU rating and the liquid fuel from the second source of fuel has a low octane rating and a high BTU rating, said method further comprising controlling the ratios of the two fuels being delivered to the carburetor wherein when the throttle is advanced beyond a certain level which results in a decrease in engine vacuum to a preset vacuum level or less, the delivery to the fuel mixing chamber of vaporized liquid fuel from the second source of fuel is stopped, which results in the engine operating on vapor fuel from first source of fuel, said vapor fuel from the first source of fuel requiring less oxygen per fuel volume than does the vaporized liquid fuel from the second source of fuel and the use of the vapor fuel from the first source of fuel develops more power in the engine under the adverse, advanced throttle conditions than would be developed by use of the fuel from the second source of fuel or by use of a mixture of fuel from the first and second sources of fuel.

19. A method of introducing fuel into the carburetor of an internal combustion engine as claimed in claim 18 wherein when the engine is accelerated, but the engine vacuum is above the preset vacuum level, the vacuum in the mixing chamber develops to or beyond a preset value and the vacuum activated valve operates to release pressurized vapor fuel from the first source of fuel to said mixing chamber, whereby the engine operates on a mixture of fuel from the first and second sources of fuel.

20. A method of introducing fuel into the carburetor of an internal combustion engine as claimed in claim 17, said method further comprising controlling the rate of production of vaporized fuel from the second source of fuel wherein
  stopping delivery of liquid fuel from the second source of fuel to the means for heating and vaporizing the liquid fuel when the throttle is retarded to a predetermined setting and resuming delivery of the vaporized fuel from the second source of fuel to the means for heating and vaporizing the liquid fuel when the throttle is advanced beyond said predetermined setting;
  controlling the rate of liquid fuel delivered to the means for heating and vaporizing the liquid fuel in accordance with the throttle advance when the throttle is advanced beyond said predetermined setting; and
  venting vaporized liquid fuel from the means for heating and vaporizing the liquid fuel whenever the pressure in said means for heating and vaporizing the liquid fuel attains or exceeds a preset value.

21. A method of introducing fuel into the carburetor of an internal combustion engine as claimed in claim 17, wherein the method of heating and vaporizing the liquid fuel from the second source of fuel comprises
  delivering the liquid fuel to an elongate heat exchange conduit which is positioned such that the liquid fuel delivered thereto will flow down the heat exchange conduit;
  providing a source of heat at the lower end of the heat exchange conduit;
  delivering a stream of pressurized vapor fuel from the first source of fuel into the heat exchange conduit at its lower end such that the vapor fuel from the first source of fuel travels upwardly through the heat exchange conduit counterflow to the liquid fuel flowing downwardly in the heat exchange conduit,
  whereby the pressure of the pressurized vapor fuel is increased as it flows through the heat exchange conduit and absorbs heat therefrom, and whereby the heated, pressurized vapor fuel transfer heat to the liquid fuel and in addition sweep the vaporized liquid fuel upwardly therein so that the vaporized liquid fuel and the stream of vapor fuel is delivered from the top of the heat exchange conduit to the mixing chamber.

22. A method of introducing fuel into the carburetor of an internal combustion engine as claimed in claim 21 wherein any unvaporized liquid fuel which flows to the lower end of the heat exchange conduit is withdrawn therefrom through a salvage fuel conduit which contains a P trap so that a back pressure is maintained in the salvage fuel conduit to prevent escape of vapor fuel from the heat exchange conduit.

23. A method of introducing fuel into the carburetor of an internal combustion engine as claimed in claim 22 wherein the pressure of the pressurized vapor fuel delivered to the heat exchange conduit is controlled within a preset range of values, and the flow of pressurized vapor fuel to the heat exchange conduit is controlled by a control valve which is regulated by the advance of the throttle, whereby when the throttle is retarded, the control valve is closed and there is no flow of pressurized vapor fuel to said heat exchange conduit, and when the throttle increases beyond a preset setting, the control valve opens proportionately to the advance of the throttle.

24. A method of introducing fuel into the carburetor of an internal combustion engine as claimed in claim 22 whereby the method further provides for venting and salvaging fuel from the heat exchange tube wherein
  vaporized liquid fuel and pressurized vapor fuel are vented through a relief valve from the heat exchange tube whenever the pressure within the heat exchange tube attains or exceeds a preset value;
  the vented vaporized liquid fuel and pressurized vapor fuel are delivered to a condensing unit and the vaporized liquid fuel is condensed to a liquid;
  the condensed liquid fuel and vapor fuel are delivered to a separation means wherein the vapor fuel is separated from the liquid fuel and the liquid fuel is recovered;
  the vapor fuel is withdrawn from the separation means to a vapor canister; and
  the vapor canister is connected to the fuel mixing chamber associated with the carburetor so that when a vacuum exists in the fuel mixing chamber, the vapor fuel is drawn from the vapor canister and fed with the other fuels in the fuel mixing chamber to the carburetor.

25. A method of introducing fuel into the carburetor of an internal combustion engine as claimed in claim 24 wherein a valve is provided between the vapor canister and the fuel mixing chamber, with the valve being adapted to be closed whenever the ignition of the engine is turned off and to be opened whenever the ignition of the engine is turned on, whereby when the engine is turned off by turning the ignition off, any residual vapor fuel which may collect in the vapor canister will be held therein until the ignition is turned on and the engine is again operated.

26. A method of introducing fuel into the carburetor of an internal combustion engine as claimed in claim 24, wherein any unvaporized liquid fuel which flows to the lower end of the heat exchange conduit is withdrawn through a salvage fuel conduit which contains a P trap, and the salvaged, liquid fuel is delivered from the P trap to the separation means wherein the salvaged liquid fuel is combined with the condensed liquid fuel.

* * * * *